(12) United States Patent
Hsu et al.

(10) Patent No.: US 11,396,967 B2
(45) Date of Patent: Jul. 26, 2022

(54) QUICK CONNECTOR ASSEMBLY AND DEVICE

(71) Applicant: ASIA IC MIC-PROCESS, INC., Taipei (TW)

(72) Inventors: Hung-Hsin Hsu, Taipei (TW); Yan-Lan Chiou, Taipei (TW)

(73) Assignee: ASIA IC MIC-PROCESS, INC., Taipei (TW)

(*) Notice: Subject to any disclaimer, the term of this patent is extended or adjusted under 35 U.S.C. 154(b) by 212 days.

(21) Appl. No.: 16/856,361

(22) Filed: Apr. 23, 2020

(65) Prior Publication Data
US 2021/0062950 A1  Mar. 4, 2021

(51) Int. Cl.
*F16L 37/38* (2006.01)
*F16L 37/12* (2006.01)
*F16L 19/04* (2006.01)

(52) U.S. Cl.
CPC ............... *F16L 37/38* (2013.01); *F16L 19/04* (2013.01); *F16L 37/12* (2013.01)

(58) Field of Classification Search
CPC ............ F16L 37/38; F16L 37/12; F16L 19/04

USPC ............................................ 137/597, 625.42
See application file for complete search history.

(56) References Cited

U.S. PATENT DOCUMENTS 8,733,668 B2* 5/2014 Markley ............ A47G 19/2266
137/597
2017/0370509 A1* 12/2017 Kobayashi et al. . B67D 7/0294

FOREIGN PATENT DOCUMENTS

WO            97/43574 A1    11/1997

* cited by examiner

*Primary Examiner* — Kevin L Lee (57) ABSTRACT

A quick connector assembly and a quick connector device are disclosed. The quick connector assembly includes a first base, a first fluid interface assembly and a valve assembly. The valve assembly regulates whether a fluid flows through the quick connector assembly or not, and thereby sealing the flow of the fluid at both sides of the quick connector assembly. The quick connector assembly and the quick connector device in an embodiment of the present disclosure can regulate the flow of the fluid effectively and provide better barriers to keep concurrent flows separated and isolated. Especially, the quick connector device can be used in slurry delivery system which has fluid being abrasive fluid or solid contained liquid.

20 Claims, 4 Drawing Sheets

QUICK CONNECTOR ASSEMBLY AND DEVICE

REFERENCE TO RELATED APPLICATIONS

This non-provisional application claims priority claim under 35 U.S.C. § 119(a) on Taiwan Patent Application No. 108211379 filed Aug. 27, 2019 the entire contents of which are incorporated herein by reference.

TECHNICAL FIELD

The present disclosure relates to a quick connector assembly and device, more particularly, to a quick connector assembly and device that utilize a valve assembly to enhance barrier for fluid leakage.

BACKGROUND

Quick connectors are often used to control contamination in industrial processes. Take chemical machine polishing or chemical mechanical planarization (CMP) process in the semiconductor industry as an example, slurry flows through the quick connector in slurry delivery system and is sprayed onto wafers for chemical polishing, wherein the quick connector is periodically removed for cleaning and maintenance in order to maintain the necessary cleanliness in the semiconductor process.

Slurry, in general, is a liquid containing solids, and so conventional quick connectors use piston or check valves to control abrasive fluid passages and flows but are not equipped with switches that stop backflows. However, since the conventional quick connector lacks the ability to stop backflow on both sides of the quick connector, leakage occurs easily during disconnection, and so does overflow of excessive returning liquid from a container like a tank when the liquid circulation loop is out of control. Moreover, liquid residue at connecting joint is common for valves and thereby increasing the risk of contamination.

SUMMARY

To solve the aforementioned issues, the present disclosure provides a quick connector assembly and a device thereof. The quick connector assembly includes a valve assembly for users to control and switch a liquid flow on both sides of the quick connector assembly via a valve control of the valve assembly. In addition, the valve assembly provides a better barrier, by which the chance of liquid residue is effectively reduced and thereby enhancing the cleanliness of each industrial process.

An object of the present disclosure is to provide a quick connector assembly that includes a first base, a first fluid interface assembly, and a valve assembly. The first base includes a first hollow structure penetrating an upper end and a lower end of the first base along a first direction of the first base, and a second hollow structure penetrating a side of the first base along a second direction of the first base, wherein the first hollow structure and the second hollow structure are in fluid communication. The first fluid interface assembly is a hollow tube and has a first end and a second end. The first fluid interface assembly is disposed in the first hollow structure of the first base and is mounted to the first base, and the first end of the first fluid interface assembly is exposed at the upper end of the first base. The valve assembly includes a valve and a valve control. The valve includes a first hollow passage and a first closure, and the valve is disposed in the second hollow structure of the first base and rotatably mounted to the first base. The valve control is connected to the valve for driving the valve to rotate in the second hollow structure of the first base when the valve control is being rotated, by which the first hollow passage of the valve is in fluid communication with the second end of the first fluid interface assembly or the first closure of the valve closes off the second end of the first fluid interface assembly.

Optionally, the quick connector assembly further includes a second fluid interface assembly, wherein the second fluid interface assembly is a hollow tube and has a third end and a fourth end. The second fluid interface assembly is disposed in the first hollow structure of the first base and is mounted to the first base, and the third end of the second fluid interface assembly is exposed at the upper end of the first base. The valve of the valve assembly further includes a second hollow passage and a second closure, wherein when the valve control is being rotated, the valve is driven to rotate in the second hollow structure of the first base, and by which the second hollow passage of the valve is in fluid communication with the fourth end of the second fluid interface assembly, or the second closure of the valve closes off the fourth end of the second fluid interface assembly.

Optionally, the valve assembly further includes a valve O-ring disposed between the first hollow passage/the first closure and the second hollow passage/the second closure to block a fluid from flowing between the first hollow passage and the second hollow passage.

Optionally, the quick connector assembly further includes a locking ring and a ring lock. The locking ring is an annular body and has a coupling hole and a locking portion, wherein the locking ring encircles a lower region of the first base through the coupling hole and the locking portion has a first thread. The ring lock is an annular body and encircles and is fixed to a groove at the lower region of the first base. A diameter of the ring lock is greater than a diameter of the coupling hole of the locking ring so as to hold the locking ring in position and to stop/prevent the locking ring from falling off the lower region of the first base.

Optionally, the quick connector assembly further includes a first seal and a second seal. The first seal is a hollow tube and has a fifth end and a sixth end. The fifth end is disposed at the lower end of the first base. The first seal further includes a first seal O-ring, wherein the first seal O-ring encircles an outer side of the first seal and is disposed between the fifth end and the sixth end. The second seal is a hollow tube and has a seventh end and an eighth end. The seventh end is disposed at the lower end of the first base. The second seal further includes a second seal O-ring, wherein the second seal O-ring encircles an outer side of the second seal and is disposed between the seventh end and the eighth end. The valve control is to be rotated to drive the valve to rotate in the second hollow structure of the first base, such that the first hollow passage of the valve is in fluid communication with the fifth end of the first seal and the second end of the first fluid interface assembly, and the second hollow passage of the valve is in fluid communication with the seventh end of the second seal and the fourth end of the second fluid interface assembly, or such that the first closure of the valve closes off the fifth end of the first seal and the second end of the first fluid interface assembly and the second closure of the valve closes off the seventh end of the second seal and the fourth end of the second fluid interface assembly.

Optionally, the quick connector assembly further includes a wet-gas interface assembly, and the wet-gas interface assembly is a hollow tube. The wet-gas interface assembly is disposed in the first hollow structure of the first base and is mounted to the first base, and one end of the wet-gas interface assembly is exposed at the upper end of the first base.

Another object of the present disclosure is to provide a quick connector device that includes one of the aforementioned quick connector assembly, a second base, a first fluid interface extension, and a lock. The second base includes a third hollow structure penetrating an upper end and a lower end of the second base along a third direction of the second base. The first fluid interface extension is a hollow tube and has a ninth end and a tenth end. The first fluid interface extension is disposed in the third hollow structure of the second base and is mounted to the second base, and the ninth end of the first fluid interface extension is exposed at the upper end of the second base and the third hollow structure. The lock is a hollow tube for accommodating and mounting the second base and has a first locking part and as second locking part. The first locking part locks and connects to the first base, and the second locking part locks and connects a fluid container, wherein the valve control is to be rotated to drive the valve to rotate in the second hollow structure of the first base, such that the ninth end of the first fluid interface extension is in fluid communication with or is closed off from the second end of the first fluid interface.

Optionally, when the quick connector assembly includes the second fluid interface assembly, the quick connector device further includes a second fluid interface extension. The second fluid interface extension is a hollow tube and has an eleventh end and a twelfth end. The second fluid interface extension is disposed in the third hollow structure of the second base and is mounted to the second base, and the eleventh end of the second fluid interface extension is exposed at the upper end of the second base, wherein the valve control is to be rotated to drive the valve to rotate in the second hollow structure of the first base, such that the eleventh end of the second fluid interface extension is in fluid communication with or is closed off from the fourth end of the second fluid interface.

Optionally, when the quick connector assembly includes the locking ring, the first locking part of the lock has a first locking thread corresponding to the first thread of the locking ring, and the lock encircles and is mounted to the second base by fastening the first locking thread of the first locking part and the first thread of the locking ring together.

Optionally, the second locking part of the lock has a second locking thread for correspondingly fastening to a container thread of the fluid container, such that a fluid in the fluid container is able to flow to a first pipe through the first fluid interface extension and the first fluid interface assembly upon fastening, wherein the first fluid interface extension and the first fluid interface assembly are in fluid communication.

Optionally, the second locking part of the lock includes a second locking thread for correspondingly fastening to a container thread of the fluid container. When fastened, a fluid in the fluid container is able to flow to a first pipe through the first fluid interface extension and the first fluid interface assembly in fluid communication therewith, and a fluid from a process end is able to flow to a second pipe through the second fluid interface assembly and the second fluid interface extension in fluid communication therewith, such that the fluid from the process end is returned to the fluid container.

In short, the quick connector assembly and the quick connector device of the present disclosure can reduce the probability of liquid residue at the connecting joint during liquid flow, and through the valve assembly, the circulation loop is controlled by switch to prevent overflow of excessive returning fluid from the fluid container. Therefore, the quick connector assembly and the quick connector device of the present disclosure are advantageous for markets that are industries with processes like semiconductor, medical, chemical, and food and have a demand for quick connectors.

BRIEF DESCRIPTION OF THE DRAWINGS

The structure as well as preferred modes of use, further objects, and advantages of this present disclosure will be best understood by referring to the following detailed description of some illustrative embodiments in conjunction with the accompanying drawings, in which.

DETAILED DESCRIPTION OF THE PREFERRED EMBODIMENTS

The present disclosure provides a quick connector assembly and a quick connector device. The quick connector assembly includes a first base, a first fluid interface, assembly, and a valve assembly, and further includes a locking ring. The first base includes a first hollow structure for accommodating and mounting the first fluid interface assembly, and a second hollow structure approximately perpendicular to the first hollow structure for accommodating the valve assembly in the second hollow structure. The quick connector assembly and a lock are assembled via the locking ring, and by which the quick connector assembly can be connected to a second base and a first fluid interface extension to form the quick connector device, wherein the first fluid interface extension is disposed in and mounted to a third hollow structure of the second base. The valve assembly is to be rotated to place the first fluid interface assembly and the first fluid interface extension in fluid communication with each other, wherein the point of connection further includes a first seal, or the valve assembly is to be rotated to block and close off the first fluid interface assembly and the first fluid interface extension so that the two are not in fluid communication. The quick connector device can be implemented on a fluid container like a tank or drum or chemical barrel, and a fluid in the fluid container is controlled by the valve assembly to allow or prohibit the fluid to flow through the first fluid interface assembly and the first fluid interface extension, so that backflows can be stopped on both sides and the probability of liquid residue at the connecting joint is reduced.

Figure 1A:
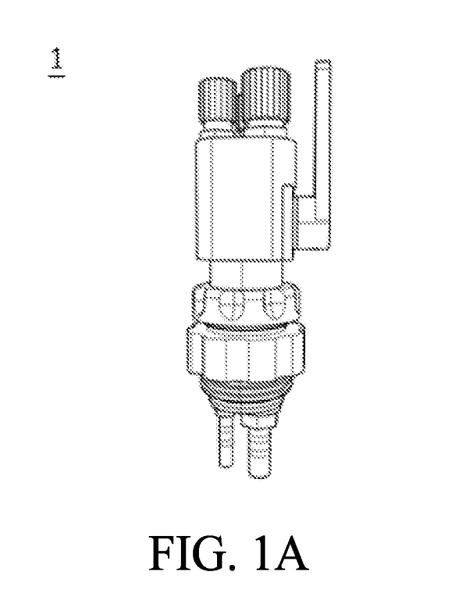
FIG. 1A is a back view of an assembled quick connector device according to a first embodiment of the present disclosure.
Figure 1B:
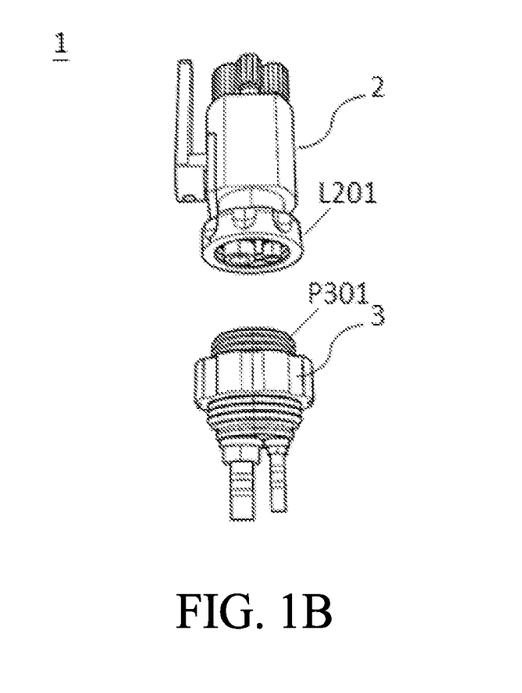
FIG. 1B is a front view of a disassembled quick connector device according to a first embodiment of the present disclosure.

FIG. 1A and FIG. 1B are respectively a back view of an assembled quick connector device and a front view of a disassembled quick connector device according to a first embodiment of the present disclosure. As shown in FIGS. 1A and 1B, the quick connector device 1 is divided into an upper portion and a lower portion, wherein the upper portion is a quick connector assembly 2. By fastening a first thread of a locking ring L201 of the quick connector assembly 2 and a first locking thread P301 of a first locking part L301 of a lock 3 together, the upper portion and the lower portion are connected to each other and the quick connector device 1 is formed.

Figure 2:
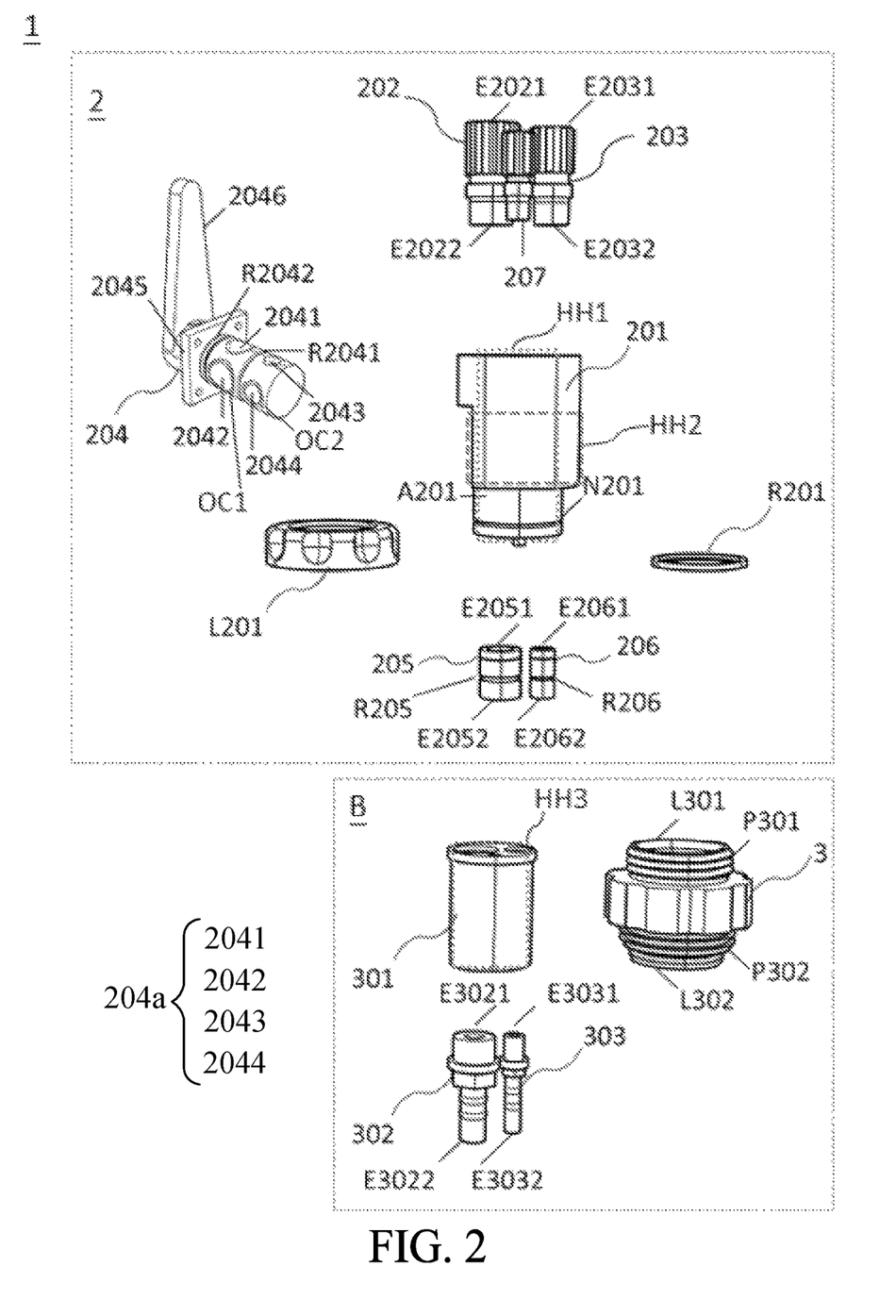
FIG. 2 is an exploded view of a quick connector device according to a first embodiment of the present disclosure.

Next, referring to FIG. 2, which is an exploded view of the quick connector device, the quick connector assembly 2 includes a first base 201, a first fluid interface assembly 202, a second fluid interface assembly 203, and a valve assembly 204.

The first base 201 has an upper end, a lower end, and a side, and includes a first hollow structure HH1 and a second hollow structure HH2. The first hollow structure HH1 penetrates the upper end and the lower end of the first base along a first direction of the first base, wherein the figure shows the first direction from up to down. The second hollow structure HH2 penetrates the side of the second base along a second direction of the first base, wherein the figure shows the second direction from left to right and approximately perpendicular to the first direction. The first hollow structure HH1 and the second hollow structure HH2 are in fluid communication with each other. The first hollow structure HH1 of the first base 201 accommodates and mounts the first fluid interface assembly 202 and the second fluid interface assembly 203, and the second hollow structure HH2 accommodates the valve assembly 204 in such a way that the valve assembly 204 is rotatable in the second hollow structure HH2. It is to be noted that the present disclosure does not limit the number of fluid interface assemblies 202, 203, wherein there can also be just one or multiple fluid interface assemblies, and the present disclosure dose not limit the number of hollows in the first hollow structure HH1, wherein under normal circumstances, the number of hollows in the first hollow structure HH1 corresponds to the number of fluid interface assemblies.

Continue with FIG. 2, the first fluid interface assembly 202 and the second fluid interface assembly 203 are hollow tubes. The first fluid interface assembly 202 has a first end E2021 and a second end E2022, and the second fluid interface assembly 203 has a third end E2031 and a fourth end E2032. When the first fluid interface assembly 202 and the second fluid interface assembly 203 are accommodated in, or disposed in, and mounted in the first hollow structure HH1 the first end E2021 of the first fluid interface assembly 202 and the third end E2031 of the second fluid interface assembly 203 are exposed at the upper end of the first base 201 as shown in FIGS. 1A and 1B.

The valve assembly 204 includes a valve 204a and a valve control 2046. In the first embodiment of the present disclosure, the valve control 2046 is a handle, but the present disclosure is not limited thereto, the valve control 2046 can also be a turntable or a knob. The valve 204a includes a first hollow passage 2041, a second hollow passage 2043, a first closure 2042, and a second closure 2044. When the valve assembly 204 is disposed on the first base 201 via a mount 2045 and screws, the valve 204a is placed and accommodated in the second hollow structure HH2 of the first base 201. The directions of the first hollow passage 2041, the second hollow passage 2043, the first closure 2042, and the second closure 2044 are adjustable by rotating the valve control 2046, which in this case is the handle, with force applied onto the first base 201, and thereby driving and controlling the valve 204a to rotate.

When the first base 201, the first fluid interface assembly 202, the second fluid interface assembly 203, and the valve assembly 204 are assembled together, the valve assembly 204 regulates or controls whether a fluid flows through the first fluid interface assembly 202 and the first hollow passage 2041 or stops flow at the first fluid interface assembly 202 and the first closure 2042, and regulates/controls whether a fluid flows through the second fluid interface assembly 203 and the second hollow passage 2043 or stops flow at the second fluid interface assembly 203 and the second closure 2044. For example, when the valve control 2046 of the valve assembly 204 is being rotated to drive the valve 204a to rotate, like the handle being rotated to be parallel to the first fluid interface assembly 202 in this embodiment but the present disclosure is not limited thereto, to place the first hollow passage 2041 and the second end E2022 of the first fluid interface assembly 202 face each other and the second hollow passage 2043 and the fourth end E2032 of the second fluid interface assembly 203 face each other, the fluid is allowed to flow between the first hollow passage 2041 and the first fluid interface assembly 202 and between the second hollow passage 2043 and the second fluid interface assembly 203. Moreover, when the valve control 2046 of the valve assembly 204 is being rotated to, for this embodiment but the present disclosure is not limited thereto, a position where the handle is perpendicular to the first fluid interface assembly 202, which drives the valve 204a to rotate and places the first closure 2042 to block and close off the second end E2022 of the first fluid interface assembly 202 and also places the second closure 2044 to block and close off the fourth end E2032 of the second fluid interface assembly 203, the fluid is prohibited to flow between the first hollow passage 2041 and the first fluid interface assembly 202 and is prohibited to flow between the second hollow passage 2043 and the second fluid interface assembly 203. In addition, the first closure 2042 includes a first closure O-ring OC1 and the second closure includes a second closure O-ring OC2, wherein the first and the second closure O-rings OC1 OC2 are respectively used to enhance the seal of the two closures 2042, 2044 and fortify the seal effect, but the present disclosure is not limited thereto, in other words, the first and the second closure O-rings OC1, OC2 are not essential elements.

Referring to FIG. 2, the valve assembly 204 further includes an inner valve O-ring R2041 and an outer valve O-ring R2042. The inner valve O-ring 82041 is tightly looped around and disposed between the first hollow passage 2041 and the second hollow passage 2043 as well as between the first closure 2042 and the second closure 2044, and the outer valve O-ring 82042 is tightly looped around and disposed between the first hollow passage 2041 and the mount 2045. The inner valve O-ring 82041 and the outer valve O-ring R2042 are used as barriers between two fluids that respectively flow through the first hollow passage 2041 and the second hollow passage 2043 to prevent leakage when fluid flows through the quick connector assembly 2. The inner valve O-ring R2041 and the outer valve O-ring 82042 enhance the seal of the flow passages and fortify the seal effect.

The quick connector assembly 2 shown in FIG. 2 further includes a first seal 205 and a second seal 206, wherein the two seals 205, 206 are both hollow tubes. The first seal 205 has a fifth end E2051 and a sixth end E2052, and the second seal has a seventh end E2061 and an eighth end E2062. The fifth end E2051 of the first seal 205 and the seventh end E2061 of the second seal 206 are accommodated at a lower end of the first hollow structure HH1 of the first base 201. When the first base 201, the first fluid interface assembly 202, the second fluid interface assembly 203, the valve assembly 204, the first seal 205, and the second seal 206 are assembled together, and after the valve control 2046 of the valve assembly 204 drives the valve 204a to rotate, the first hollow passage 2041 of the valve 204a is in fluid communication with the first seal 205 and the first fluid interface assembly 202, and the second hollow passage 2043 is also in fluid communication with the second seal 206 and the second fluid interface assembly 203. Or, after the valve control 2046 of the valve assembly 204 drives the valve 204a to rotate, the first closure 2042 of the valve 204a closes off the fifth end E2051 of the first seal 205 and the second closure 2044 of the valve 204a also closes off the seventh end E2061 of the second seal 206. The first seal 205 further includes a first seal O-ring R205 and the second seal 206 further includes a second seal O-ring R206, wherein the first seal O-ring R205 and the second seal O-ring R206 respectively encircle the outer sides of the first seal 205 and the second seal 206, and a function thereof will be described later. It is to be noted that the present disclosure does not limit the number of seals, and under normal circumstances, the number of the seals corresponds to the number of hollow passages in the valve 204a or the number of fluid interface assemblies.

In specific, the quick connector assembly 2 further includes a locking ring L201 and a ring lock R201. The locking ring L201 and the ring lock 8201 are of an annular body. The locking ring L201 has a coupling hole and a locking portion, wherein the locking ring L201 encircles the first base 201 at a lower region A201 thereof via the coupling hole. The locking portion has a first thread, and in this embodiment, the first thread is a female thread but the present disclosure is not limited thereby, the first thread can also be a male thread. When the locking ring L201 and the first base 201 are assembled together, the ring lock R201 is used to fix the locking ring L201 in position. The lower region A201 of the first base 201 has a groove N201, and when the locking ring L201 and the first base 201 are assembled, the ring lock 8201 is placed over and fixed to the groove N201 of the first base 201. Since a diameter of the ring lock R201 is greater than an inner diameter of the locking ring L201, the ring lock R201 can prevent the fall-off of the locking ring R201 from the lower region A201 of the first base 201, in other words, the locking ring L201 is blocked and held by the ring lock R201 to prevent it from dropping or disengaging from the first base 201 due to gravity or other external force. The inner diameter of the locking ring L201 is, for example, the diameter of the coupling hole.

The structure of the quick connector assembly 2 has been described above in detail. Furthermore, the quick connector device 1 shown in FIG. 2 includes a second base 301, a first fluid interface extension 302, a second fluid interface extension 303, and a lock 3.

The second base 301 has an upper end and a lower end, and includes a third hollow structure HH3 penetrating the upper end and the lower end of the second base along a third direction, wherein the third direction is shown from up to down in the figure. The third hollow structure HH3 of the second base 301 accommodates and mounts the first fluid interface extension 302 and the second fluid interface extension 303. It is to be noted that the present disclosure does not limit the number of hollows in the third hollow structure, and under normal circumstances, the number of fluid interface extensions and the number of hollows in the third hollow structure correspond to the number of fluid interface assemblies in the quick connector assembly 2.

Referring to FIG. 2, the first fluid interface extension 302 and the second fluid interface extension 303 are hollow tubes. The first fluid interface extension 302 has a ninth end E3021 and a tenth end E3022 and the second fluid interface extension 303 has an eleventh end E3031 and a twelfth end E3032. When the first fluid interface extension 302 and the second fluid interface extension 303 are accommodated/disposed and mounted in the third hollow structure HH3 of the second base 301, the ninth end E3021 of the first fluid interface extension 302 and the eleventh end E3031 of the second fluid interface extension end 303 are surrounded and covered by the second base 301, and are exposed by an opening formed by the third hollow structure HH3 at the upper end of the second base 301.

When the upper portion of the quick connector device 1, which is the quick connector assembly 2, is to be assembled to the lower portion B, the lock 3 is used, wherein the lower portion B of the quick connector device 1 includes the lock 3, the second base 301, the first fluid interface extension 302 and the second fluid interface extension 303, but the present disclosure does not limit the number of fluid interface extensions in the lower portion B of the quick connector device 1. As shown in FIG. 2, the lock 3 is a hollow tube and has a first locking part L301 and a second locking part L302, wherein the first locking part L301 has a first locking thread P301 and the second locking part L302 has a second locking thread P302, In the first embodiment, the first locking thread P301 and the second locking thread P302 are male threads but the present disclosure is not limited thereby, the two locking threads P301, P302 can be female threads, and the present disclosure does not limit forms and types of the first locking part L301 and the second locking part L302. When the upper portion and the lower portion B of the quick connector device 1 are assembled together, the lock 3 connects the first base 201 and the second base 301 by fastening the first locking thread P301 of the first locking part L301 and the first thread of the locking ring L301 of the quick connector assembly 2 together, and thereby placing the ninth end E3021 of the first fluid interface extension 302 in contact with and in fluid communication with the first seal 205 and placing the eleventh end E3031 of the second fluid interface extension 303 in contact with and in fluid communication with the second seal 206. Moreover, the first seal O-ring 8205 of the first seal 205 and the second seal O-ring R206 of the second seal 206 enhance the tightness between the first seal 205, the second seal 206 and the second base 301.

The quick connector device 1 in FIG. 2 further includes a wet-gas interface assembly 207. The wet-gas interface assembly 207 is a hollow tube and is disposed in and mounted to the first hollow structure HH1 of the first base 201 in such a way that one end of the wet-gas interface assembly 207 is exposed at the upper end of the first hollow structure HH1/the first base, so as to allow wet gas, such as wet nitrogen but not limited thereto, to flow in and out of the quick connector device 1 via the wet-gas interface assembly 207. Hence the moisture and pressure balance therein is maintained.

When the quick connector device 1 is assembled as aforementioned and the valve assembly 204 is put into a flowing mode, the first fluid interface assembly 202 is in fluid communication with the first hollow passage 2041 of the valve assembly 204, the first seal 205, and the first fluid interface extension 302, and the second fluid interface assembly 203 is in fluid communication with the second hollow passage 2043 of the valve assembly 204, the second seal 206, and the second fluid interface extension 303.

Figure 3:
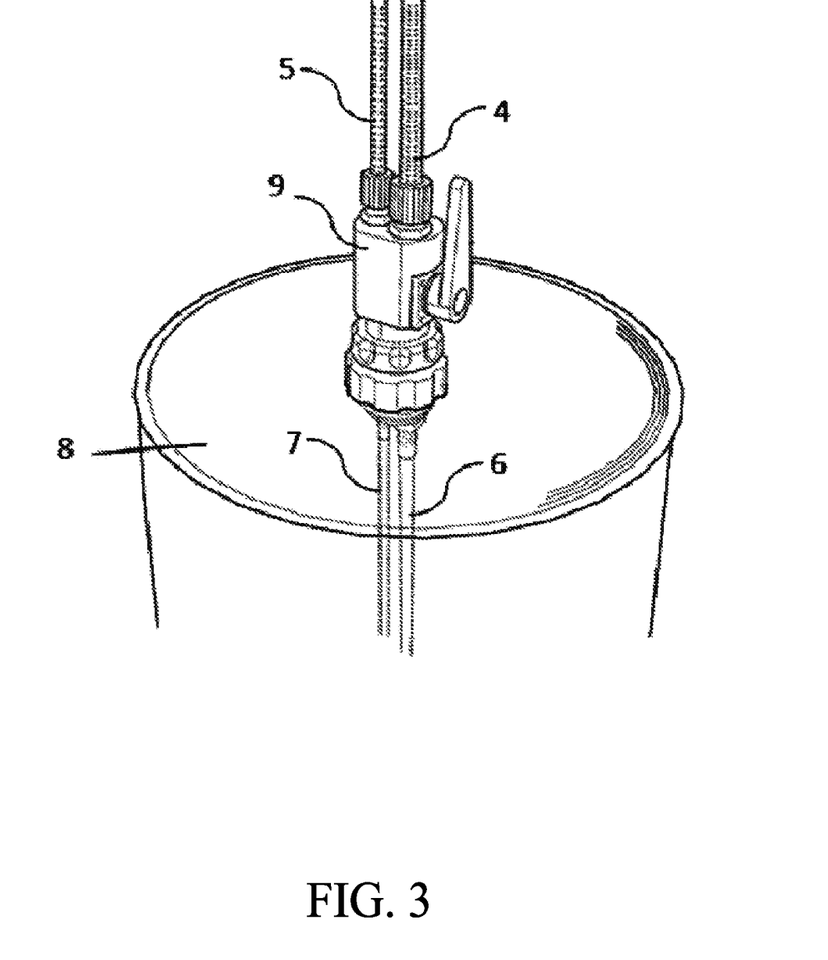
FIG. 3 is a schematic diagram of a quick connector device implemented on a fluid container according to a second embodiment of the present disclosure.
Figure 4:
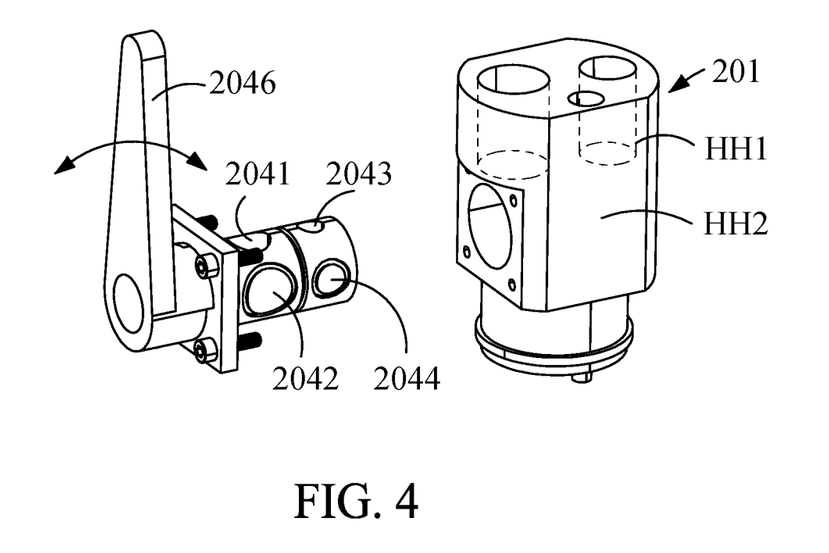
FIG. 4 is a three-dimensional schematic diagram of the valve assembly and the first base according to a first embodiment of the present disclosure.
Figure 5:
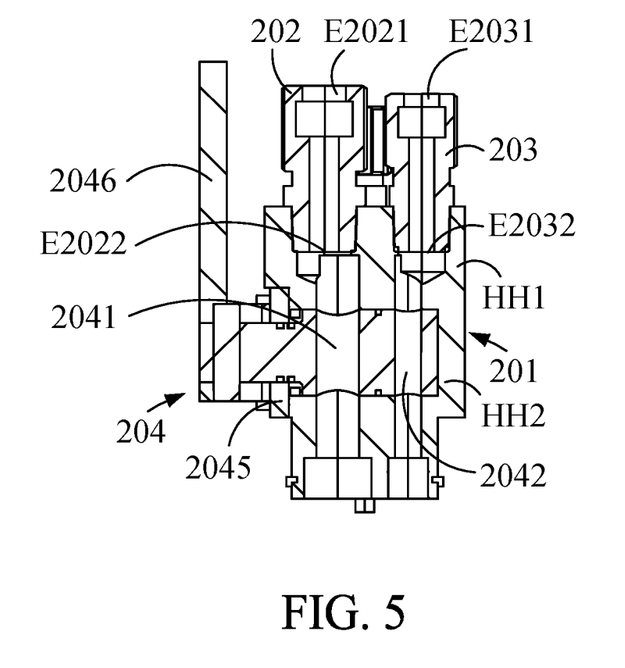
FIG. 5 is a cross-sectional view of the valve assembly and the first base according to a first embodiment of the present disclosure.

Refer to FIG. 2 and FIG. 3, FIG. 3 is a schematic diagram illustrating a quick connector device being implemented on a fluid container according to a second embodiment of the present disclosure. As shown in FIG. 3, the lock 3 (shown in FIG. 2) is used to implement and install the quick connector device 1 on the fluid container 8 for fluid transportation and control. The second locking part of the lock 3 has the second locking thread P302 (shown in FIG. 2) that corresponds to a container thread of the fluid container 8, and so the lock 3 fastens the quick connector device 1 on the fluid container 8 via the second locking thread P302 (shown in FIG. 2). In addition, the first fluid interface assembly 202 (shown in FIG. 2), the second fluid interface assembly 203 (shown in FIG. 2), the first fluid interface extension 302 (shown in FIG. 2), and the second fluid interface extension 303 (shown in FIG. 2) are connected to a first pipe 4, a second pipe 5, a first pipe extension 6, and a second pipe extension 7, respectively, for a fluid in the fluid container 8 to be able to flow therethrough, but whether the fluid flows through the quick connector device 1 or not is regulated and controlled by the quick connector device 1. For example, when the first pipe 4 and the first pipe extension 6 act as outflow pipes and are respectively connected to the first fluid interface assembly 202 (shown in FIG. 2) and the first fluid interface extension 302 (shown in FIG. 2) in an all rounded fashion, and the second pipe 5 and the second pipe extension 7 act as return pipes and are connected respectively to the second fluid interface assembly 203 (shown in FIG. 2) and the second fluid interface extension 303 (shown in FIG. 2) in an all rounded fashion, and the valve assembly 204 (shown in FIG. 2) of the quick connector device 1 is put in the flowing mode, the fluid is withdrew from the fluid container 8 by a power machine and delivered to a process end through the outflow pipes, namely the first pipe 4 and the first pipe extension 6. Moreover, for fluid circulation, the fluid can be returned to the fluid container 8 from the process end through the return pipes, namely the second pipe 5 and the second pipe extension 7, but the present disclosure is not limited thereby. On the contrary, when the valve assembly 204 (shown in FIG. 2) of the quick connector device 1 is put in a stop mode, the flow of the fluid is stopped on both sides of the quick connector device. Moreover, when the quick connector device 1 further includes the wet-gas interface assembly 207 as described in the first embodiment and as shown in FIG. 2, wet gas like nitrogen is introduced by the wet-gas interface assembly to balance the moisture and pressure. The moist effect can prevent crystallization on the inner wall of the fluid container above a fluid surface level, for example, liquid level. The pressure balance can prevent negative pressure being generated in the fluid container when the power machine is withdrawing fluid, so as to avoid damage to the fluid container due to the negative pressure. In specific, the outflow pipe refers to the fluid flowing out of the fluid container, the return pipe refers to the fluid flowing back into the fluid container, and all rounded connection refers to no blind spot or dead end in the connection/connecting joint.

In view of above, the technical benefits of the quick connector assembly and the quick connector device as described by the embodiments of the present disclosure, in comparison to the conventional technology, are described below.

In conventional technology, the quick connectors with piston or check valves lack the ability to stop backflow on both sides, and so leakage occurs often when taking the quick connector out, as well as it is easy to leave liquid residue at the connecting joints which causes contamination. On the other hand, the quick connector assembly and the quick connector device of the present disclosure control the flow of the fluid via the valve assembly and further stay in a closed off position when the fluid circulation path is out of control to prevent leakage. Moreover, the quick connector assembly and the quick connector device of the present disclosure further include multiple O-rings disposed at different places to enhance leakage barriers. Further, the quick connector device can be used in slurry delivery system which has fluid being abrasive fluid or solid contained liquid, but the present disclosure is not limited thereto.

The above disclosure is only the preferred embodiment of the present disclosure, and not used for limiting the scope of the present disclosure. All equivalent variations and modifications on the basis of shapes, structures, features and spirits described in claims of the present disclosure should be included in the claims of the present disclosure.

What is claimed is:

1. A quick connector assembly comprising:
  a first base with an upper end, a lower end, and a side, the first base comprising:
    a first hollow structure penetrating the upper end and the lower end of the first base along a first direction; and
    a second hollow structure penetrating the side of the first base along a second direction, wherein the first hollow structure and the second hollow structure are in fluid communication;
  a first fluid interface assembly disposed in the first hollow structure of the first base and mounted to the first base, the first fluid interface assembly being a hollow tube and comprising a first end and a second end, wherein the first end of the first fluid interface assembly is exposed at the upper end of the first base; and
  a valve assembly comprising:
    a valve disposed in the second hollow structure of the first base and rotatably mounted to the first base, the valve comprising a first hollow passage and a first closure; and
    a valve control connected to the valve for driving the valve to rotate in the second hollow structure, wherein when the valve control is being rotated, the valve rotates and the second end of the first fluid interface assembly is in fluid communication with the first hollow passage of the valve or is closed off by the first closure of the valve.

2. The quick connector assembly of claim 1, further comprising:
  a second fluid interface assembly disposed in the first hollow structure of the first base and mounted to the first base, the second fluid interface assembly being a hollow tube and comprising a third end and a fourth end, wherein the third end of the second fluid interface assembly is exposed at the upper end of the first base;
  wherein the valve of the valve assembly further comprises a second hollow passage and a second closure, and when the valve control is being rotated, the valve rotates in the second hollow structure of the first base and the fourth end of the second fluid interface assembly is in fluid communication with the second hollow passage of the valve or is closed off by the second closure of the valve.

3. The quick connector assembly of claim 2, wherein the valve assembly further comprises:
a valve O-ring disposed between the first hollow passage and the second hollow passage of the valve and between the first closure and the second closure of the valve, so as to block a fluid from flowing between the first hollow passage and the second hollow passage.

4. The quick connector assembly of claim 1, wherein the first base further comprises a lower region and a groove formed at the lower region, and the quick connector assembly further comprises:
a locking ring, the locking ring being an annular body and comprising a coupling hole and a locking portion with a first thread, wherein the locking ring encircles the lower region of the first base through the coupling hole; and
a ring lock, the ring lock being an annular body and encircling and fixed to the groove at the lower region of the first base;
wherein a diameter of the ring lock is greater than a diameter of the coupling hole of the locking ring for preventing fall-off of the locking ring from the lower region of the first base.

5. The quick connector assembly of claim 2, further comprising:
a first seal, the first seal being a hollow tube and comprising a fifth end, a sixth end, and a first seal O-ring, wherein the fifth end is disposed at the lower end of the first base, and the first seal O-ring encircles an outer side of the first seal between the fifth end and the sixth end; and
a second seal, the second seal being a hollow tube and comprising a seventh end, an eighth end, and a second seal O-ring, wherein the seventh end is disposed at the lower end of the first base, and the second seal O-ring encircles an outer side of the second seal between the seventh end and the eighth end;
wherein when the valve control is being rotated, the valve rotates in the second hollow structure of the first base, and the first hollow passage of the valve is in fluid communication with the fifth end of the first seal and the second end of the first fluid interface assembly and the second hollow passage of the valve is in fluid communication with the seventh end of the second seal and the fourth end of the second fluid interface assembly, or, the first closure of the valve closes off the fifth end of the first seal and the second end of the first fluid interface assembly and the second closure of the valve closes off the seventh end of the second seal and the fourth end of the second fluid interface assembly.

6. The quick connector assembly of claim 1, further comprising:
a wet-gas interface assembly disposed in the first hollow structure of the first base and mounted to the first base, wherein the wet-gas interface assembly is a hollow tube and one end of the wet-gas interface assembly is exposed at the upper end of the first base.

7. A quick connector device comprising:
a quick connector assembly as described in claim 1;
a second base with an upper end and a lower end, the second base comprising:
a third hollow structure penetrating the upper end and the lower end of the second base along a third direction;
a first fluid interface extension disposed in the third hollow structure of the second base and mounted to the second base, the first fluid interface extension being a hollow tube and comprising a ninth end and a tenth end, wherein the ninth end of the first fluid interface extension is exposed at the upper end of the second base and the third hollow structure; and
a lock for accommodating and mounting the second base, the lock being a hollow tube and comprising a first locking part and a second locking part, wherein the first locking part locks and connects to the first base, and the second locking part locks and connects to a fluid container;
wherein when the valve control is being rotated, the valve rotates in the second hollow structure of the first base and the ninth end of the first fluid interface extension is in fluid communication with or is closed off from the second end of the first fluid interface assembly.

8. The quick connector device of claim 7, wherein the quick connector assembly further comprises
a second fluid interface assembly disposed in the first hollow structure of the first base and mounted to the first base, the second fluid interface assembly being a hollow tube and comprising a third end and a fourth end, wherein the third end of the second fluid interface assembly is exposed at the upper end of the first base;
wherein the valve of the valve assembly further comprises a second hollow passage and a second closure, and when the valve control is being rotated, the valve rotates in the second hollow structure of the first base and the fourth end of the second fluid interface assembly is in fluid communication with the second hollow passage of the valve or is closed off by the second closure of the valve.

9. The quick connector device of claim 8, further comprising:
a second fluid interface extension disposed in the third hollow structure of the second base and mounted to the second base, the second fluid interface extension being a hollow tube and comprising an eleventh end and a twelfth end, wherein the eleventh end of the second fluid interface extension is exposed at the upper end of the second base;
wherein when the valve control is being rotated, the valve rotates in the second hollow structure of the first base and the eleventh end of the second fluid interface extension is in fluid communication with or is closed off from the fourth end of the second fluid interface assembly.

10. The quick connector device of claim 7, wherein the first base further comprises a lower region and a groove formed at the lower region, and the quick connector assembly further comprises:
a locking ring, the locking ring being an annular body and comprising a coupling hole and a locking portion with a first thread, wherein the locking ring encircles the lower region of the first base through the coupling hole; and
a ring lock, the ring lock being an annular body and encircling and fixed to the groove at the lower region of the first base;
wherein a diameter of the ring lock is greater than a diameter of the coupling hole of the locking ring for preventing fall-off of the locking ring from the lower region of the first base.

11. The quick connector device of claim 10, wherein the first locking part of the lock comprises a first locking thread corresponding to the first thread of the locking ring, and the lock encircles and is mounted to the second base, and the lock is locked to the lock ring by fastening the first locking thread and the first thread together.

12. The quick connector device of claim 11, therein the second locking part of the lock comprises a second locking thread for correspondingly fastening to a container thread of the fluid container, wherein when fastened, a fluid in the fluid container is able to flow to a first pipe through the first fluid interface extension and the first fluid interface assembly in fluid communication therewith.

13. The quick connector device of claim 8, wherein the valve assembly further comprises:
   a valve O-ring disposed between the first hollow passage and the second hollow passage of the valve and between the first closure and the second closure of the valve, so as to block a fluid from flowing between the first hollow passage and the second hollow passage.

14. The quick connector device of claim 9, wherein the first base further comprises a lower region and a groove formed at the lower region, and the quick connector assembly further comprises:
   a locking ring, the locking ring being an annular body and comprising a coupling hole and a locking portion with a first thread, wherein the locking ring encircles the lower region of the first base through the coupling hole; and
   a ring lock, the ring lock being an annular body and encircling and fixed to the groove at the lower region of the first base;
   wherein a diameter of the ring lock is greater than a diameter of the coupling hole of the locking ring for preventing fall-off of the locking ring from the lower region of the first base.

15. The quick connector device of claim 14, wherein the first locking part of the lock comprises a first locking thread corresponding to a first thread of the locking ring, and the lock encircles and is mounted to the second base, and the lock is locked to the lock ring by fastening the first locking thread and the first thread together.

16. The quick connector device of claim 15, wherein the second locking part of the lock comprises a second locking thread for correspondingly fastening to a container thread of the fluid container, wherein when fastened, a fluid in the fluid container is able to flow to a first pipe through the first fluid interface extension and the first fluid interface assembly in fluid communication therewith, and a fluid from a process end is able to flow to a second pipe through the second fluid interface assembly and the second fluid interface extension in fluid communication therewith, such that the fluid from the process end is returned to the fluid container.

17. The quick connector device of claim 8, wherein the quick connector assembly further comprises:
   a first seal, the first seal being a hollow tube and comprising a fifth end, a sixth end, and a first seal O-ring, wherein the fifth end is disposed at the lower end of the first base, and the first seal O-ring encircles an outer side of the first seal between the fifth end and the sixth end; and
   a second seal, the second seal being a hollow tube and comprising a seventh end, an eighth end, and a second seal O-ring, wherein the seventh end is disposed at the lower end of the first base, and the second seal O-ring encircles an outer side of the second seal between the seventh end and the eighth end;
   wherein when the valve control is being rotated, the valve rotates in the second hollow structure of the first base, and the first hollow passage of the valve is in fluid communication with the fifth end of the first seal and the second end of the first fluid interface assembly and the second hollow passage of the valve is in fluid communication with the seventh end of the second seal and the fourth end of the second fluid interface assembly, or, the first closure of the valve closes off the fifth end of the first seal and the second end of the first fluid interface assembly and the second closure of the valve closes off the seventh end of the second seal and the fourth end of the second fluid interface assembly.

18. The quick connector device of claim 9, wherein the quick connector assembly further comprises:
   a first seal, the first seal being a hollow tube and comprising a fifth end, a sixth end, and a first seal O-ring, wherein the fifth end is disposed at the lower end of the first base, and the first seal O-ring encircles an outer side of the first seal between the fifth end and the sixth end; and
   a second seal, the second seal being a hollow tube and comprising a seventh end, an eighth end, and a second seal O-ring, wherein the seventh end is disposed at the lower end of the first base, and the second seal O-ring encircles an outer side of the second seal between the seventh end and the eighth end;
   wherein when the valve control is being rotated, the valve rotates in the second hollow structure of the first base, and the first hollow passage of the valve is in fluid communication with the fifth end of the first seal and the second end of the first fluid interface assembly and the second hollow passage of the valve is in fluid communication with the seventh end of the second seal and the fourth end of the second fluid interface assembly, or, the first closure of the valve closes off the fifth end of the first seal and the second end of the first fluid interface assembly and the second closure of the valve closes off the seventh end of the second seal and the fourth end of the second fluid interface assembly.

19. The quick connector device of claim 7, wherein the quick connector assembly further comprises:
   a wet-gas interface assembly disposed in the first hollow structure of the first base and mounted to the first base, wherein the wet-gas interface assembly is a hollow tube and one end of the wet-gas interface assembly is exposed at the upper end of the first base.

20. The quick connector device of claim 8, wherein the quick connector assembly further comprises:
   a wet-gas interface assembly disposed in the first hollow structure of the first base and mounted to the first base, wherein the wet-gas interface assembly is a hollow tube and one end of the wet-gas interface assembly is exposed at the upper end of the first base.

* * * * *